United States Patent [19]

Puderbach

[11] Patent Number: 5,307,961
[45] Date of Patent: May 3, 1994

[54] DEVICE FOR POURING VISCOUS MIXTURES HAVING SOLID INGREDIENTS

[75] Inventor: Gerhard Puderbach, Neuwied, Fed. Rep. of Germany

[73] Assignee: Winkler & Dunnebier Maschinenfabrik und Eisengiesserei KG, Neuwied, Fed. Rep. of Germany

[21] Appl. No.: 863,629

[22] Filed: Apr. 6, 1992

[30] Foreign Application Priority Data

Apr. 20, 1991 [DE] Fed. Rep. of Germany ....... 4112940

[51] Int. Cl.⁵ ............................................. B67D 5/56
[52] U.S. Cl. ..................................... 222/252; 222/136
[58] Field of Search ....................... 222/1, 129.2, 129.4, 222/136, 137, 249, 252

[56] References Cited

U.S. PATENT DOCUMENTS

| | | |
|---|---|---|
| 1,711,750 | 5/1929 | Schoppner . |
| 2,640,446 | 6/1953 | Morrison . |
| 2,705,835 | 4/1955 | Massmann ............................ 222/252 |
| 2,783,921 | 3/1957 | Stokland ............................ 222/252 |
| 3,153,531 | 10/1964 | Cook ..................................... 222/136 |
| 4,010,284 | 3/1977 | Bellew . |
| 4,621,747 | 11/1986 | van der Velde et al. ............ 222/252 |

FOREIGN PATENT DOCUMENTS

| | | |
|---|---|---|
| 330907 | 2/1989 | European Pat. Off. . |
| 650120 | 8/1937 | Fed. Rep. of Germany . |
| 3109303 | 3/1981 | Fed. Rep. of Germany . |
| 8227606.4 | 10/1982 | Fed. Rep. of Germany . |
| 55-13162 | 7/1978 | Japan . |

OTHER PUBLICATIONS

European Search Report EP 92 10 6570 dated Jun. 1992.
German Search Report P 4112940.2.

Primary Examiner—David M. Mitchell
Assistant Examiner—Stephen P. Avila
Attorney, Agent, or Firm—Collard & Roe

[57] ABSTRACT

The invention relates to a device for pouring viscous mixtures having solid ingredients including a holder and an exit die rotatably mounted below the holder and having an intake bore through which the mixture passes under pressure. A spiral-shaped stripping element is attached to the holder and has a free end extending downwardly into the intake bore. The exit die rotates with respect to the spiral-shaped stripping element, so that the solid ingredients within the mixture are serially directed through the exit die. The free end of the stripping element extends in the direction of rotation of the exit die.

3 Claims, 1 Drawing Sheet

DEVICE FOR POURING VISCOUS MIXTURES HAVING SOLID INGREDIENTS

BACKGROUND OF THE INVENTION

1. Field of the Invention

The present invention relates to a device for pouring viscous mixtures having solid ingredients, especially candy mixtures including raisins, nuts, or similar items.

Such a device is used in the production of so-called fruit bars, granola bars or similar products. The device pours the candy mixture into a baking tray, in most cases a rectangular baking pan, and then the bar is coated with chocolate.

2. The Prior Art

Conventional devices, however, are not suited for pouring candy mixtures with embedded solid ingredients onto the baking trays. The reason for this is, that the solid ingredients tend to wedge together in the entry area of the die, and thus, plug up the bore. Until now, it was necessary to first pour the candy mixture, by itself, and then to apply the solid ingredients in a subsequent work step, by means of a so-called sprinkling device. This solution is very complicated, particularly since up to about 50 dies can be arranged next to one another across the large working width of the production lines. These dies then have to be followed by just as many sprinkling devices. Furthermore, there is the risk that the solid ingredients will fall next to the bars or be pushed off the bars during the coating process, due to insufficient adhesion.

SUMMARY OF THE INVENTION

It is, therefore, an object of the present invention to provide a device which overcomes the drawback of the prior art and makes it possible to pour viscous candy mixtures having embedded solid ingredients.

These and other related objects are achieved by a device for pouring viscous mixtures having solid ingredients, including a holder and an exit die rotatably mounted below the holder and having an intake bore through which the mixture passes under pressure. A spiral-shaped stripping element is attached to the holder and has a free end extending downwardly into the intake bore. The exit die rotates with respect to the spiral-shaped stripping element, so that the solid ingredients within the mixture are serially directed through the exit die. Ideally, the spiral-shaped stripping element is fixed, and the exit die rotates. The free end of the stripping elements extends in the direction of rotation of the exit die. The intake bore is preferably cone-shaped. The spiral-shaped stripping element and the cone-shaped intake bore cooperatively channel solid ingredients through the exit die.

The device additionally includes a holder with a bore having a top end and a bottom end. The exit die is rotatably mounted on the holder, and the bottom end of the bore is in communication with the intake bore. The spiral-shaped stripping element is attached to the holder. The device additionally includes a piston operatively fitted at the top end of the bore to exert pressure on the mixture and force it through the bore and the exit die.

The device according to the invention is advantageous over the prior art devices in that it makes it possible to apply the solid ingredients, such as raisins, nuts or similar ingredients, onto the baking tray as an integral part of the candy mixture. The cloth for sprinkling devices, which typically followed the dies has been eliminated. In addition, the solid ingredients are securely enclosed within the candy mixture and will not fall off.

BRIEF DESCRIPTION OF THE DRAWINGS

Other objects and features of the present invention will become apparent from the following detailed description considered in connection with the accompanying drawing which discloses an embodiment of the present invention. It should be understood, however, that the drawing is designed for the purpose of illustration only and not as a definition of the limits of the invention.

In the drawing, wherein similar reference characters denote similar elements throughout the several views.

DETAILED DESCRIPTION OF THE PREFERRED EMBODIMENT

Usually, in the production of fruit bars or similar items there are a plurality of similar dies arranged next to one another for application of the viscous candy mixture to the baking tray. A single one of these dies will be taken as an example here and described in detail. It should be understood that any or all of the dies in the production line may be equipped of the device according to the invention.

Figure 1:
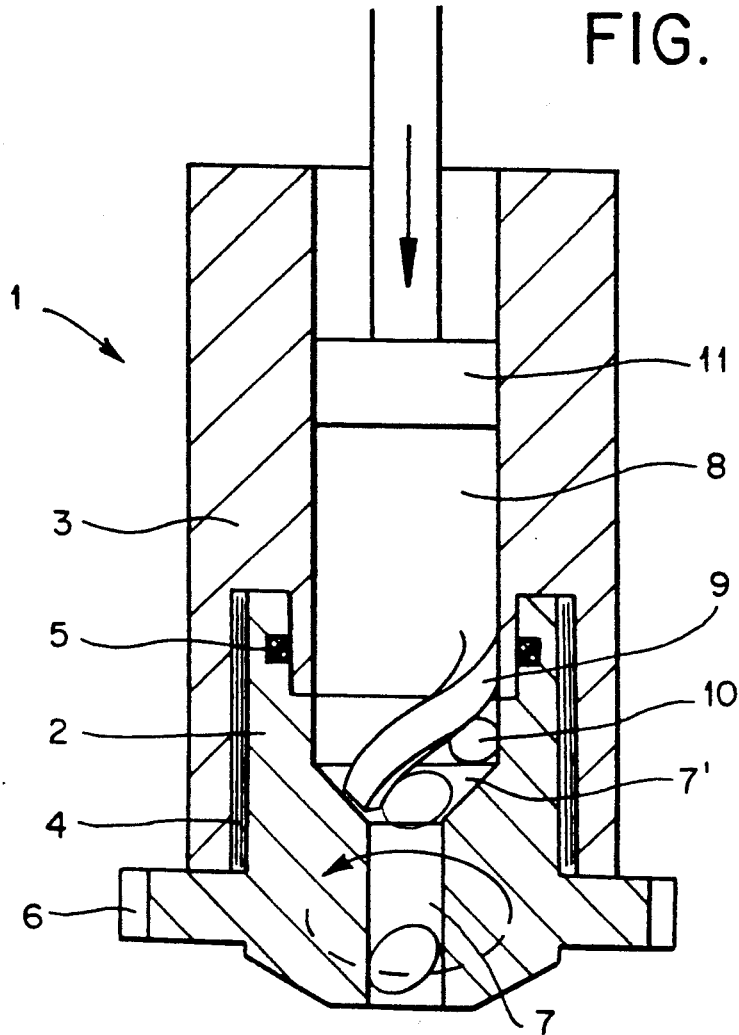
FIG. 1 is a side cross-sectional view through a die embodying the present invention.
Figure 2:
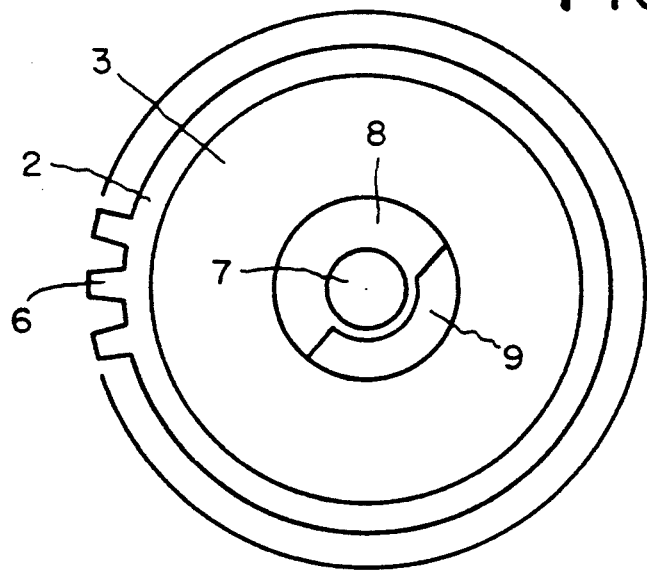
FIG. 2 is a simplified top plan view of the die of FIG. 1 without the piston.

Referring now to the drawing, and in particular FIG. 1, there is shown a die 1 which consists of an exit die 2 and its holder 3. Die 2 is mounted to rotate on bearings 4 in holder 3, and is sealed with an O-ring 5. At its lower outer edge, exit die 2 has gear teeth 6, which engage a counter-wheel, not shown, to rotate exit die 2 in the direction of the arrow. Exit die 2 has an exit bore 7 in its lower half, through which the mixture exits die 1. Holder 3 also includes a bore 8 which is wider than exit bore 7. A funnel shaped intake bore 7, in exit die 2, is located above exit bore 7 to connect it to bore 8. A stripper element 9, is rigidly connected to the lower portion of holder 3, and projects downwardly into intake bore 7 of exit die 2. Stripper element 9 is structured as a right-hand screw thread with a steep incline, and lies close against the wall of intake bore 7. However, stripper element 9 does not contact intake bore 7.

The device operates as follows. The candy mixture with solid ingredients, e.g. raisins 10, is introduced into bore 8 and is brought under pressure by a piston 11. The mixture then enters intake bore 7. The counter-wheel rotates exit die 2, via gear teeth 6, clockwise at several tens of revolutions per minute. The candy mixture within exit die 2 is also caused to rotate, due to its internal friction. The mixture within intake bore 7 passes along the bottom of the right-hand-thread stripper element 9 towards exit bore 7. The raisins 10 also come in contact with stripper element 9 and are directed towards exit bore 7. The raisins, due to the narrow opening between stripper element 9 and the walls of intake bore 7, line up behind one another and enter exit bore 7, one at a time. This single file arrangement of solid ingredients precludes the possibility that exit bore 7 will be plugged up.

While a single embodiment of the present invention has been shown and described, it is to be understood that many changes and modifications may be made thereunto without departing from the spirit and scope of the invention as defined in the appended claims.

What is claimed is:

1. A device for pouring viscous mixtures having solid ingredients comprising:
    a holder having a cylindrical inner surface defining a bore with a top end and a bottom end;
    an exit die rotatably mounted below said holder having an intake bore through which the mixture passes under pressure, said bottom end of said bore being in communication with said intake bore;
    a piston operatively fitted at said top end of said bore to exert pressure on the mixture, thereby forcing it through said bore and said exit die; and
    a spirally shaped stripping element attached to said inner surface and having a free end extending downwardly into said intake bore, said stripping element lying close to said exit die, wherein said exit die rotates with respect to said spirally-shaped stripping element, so that the solid ingredients within the mixture are serially directed through said exit die.

2. The device for pouring viscous mixtures according to claim 1, additionally including a sealing O-ring located between said holder and said exit die.

3. A device for pouring viscous mixtures having solid ingredients comprising:
    a stationary holder having a cylindrical inner surface defining a longitudinally extending bore;
    a piston adapted for longitudinal movement within the bore;
    an exit die rotatably mounted below said holder having a cone-shaped inner wall defining an intake bore, the mixture passing under pressure from said piston through the intake bore; and
    a stationary spirally-shaped stripping element having
    i. a fixed end attached to said stationary cylindrical inner surface;
    ii. a free end extending downwardly into the cone-shaped intake bore of said rotating exit die;
    iii. said stationary stripping element lying close to said rotating cone-shaped inner wall; and
    iv. the solid ingredients within the mixture are serially directed through said exit die, whereby the single file arrangement of solid ingredients between said stationary stripping element and said rotating inner wall precludes the possibility of clogging said exit die.

* * * * *